United States Patent
Bujard et al.

(10) Patent No.: US 7,959,727 B2
(45) Date of Patent: Jun. 14, 2011

(54) INTERFERENCE PIGMENTS ON THE BASIS OF SILICON OXIDES

(75) Inventors: Patrice Bujard, Reinach (CH); Holger Leybach, Maulburg (DE)

(73) Assignee: BASF SE, Ludwigshafen (DE)

( * ) Notice: Subject to any disclaimer, the term of this patent is extended or adjusted under 35 U.S.C. 154(b) by 296 days.

(21) Appl. No.: 12/380,364

(22) Filed: Feb. 26, 2009

(65) Prior Publication Data

US 2009/0169499 A1  Jul. 2, 2009

Related U.S. Application Data

(63) Continuation of application No. 10/530,099, filed as application No. PCT/EP03/11077 on Oct. 7, 2003, now Pat. No. 7,517,404.

(30) Foreign Application Priority Data

Oct. 16, 2002 (EP) .................................. 02405887
Nov. 21, 2002 (EP) .................................. 02406009

(51) Int. Cl.
C04B 14/04 (2006.01)
C04B 14/00 (2006.01)
C09C 1/04 (2006.01)
C09C 1/14 (2006.01)
C09C 1/36 (2006.01)
B32B 5/16 (2006.01)
B32B 9/00 (2006.01)

(52) U.S. Cl. ........ 106/481; 106/426; 106/431; 106/434; 106/442; 106/482; 428/403; 428/404

(58) Field of Classification Search .................. 106/426, 106/431, 434, 442, 481, 482; 427/255.7; 428/403, 404
See application file for complete search history.

(56) References Cited

U.S. PATENT DOCUMENTS

| | | | | |
|---|---|---|---|---|
| 3,920,864 A | 11/1975 | Greenberg et al. | ............ | 427/169 |
| 5,624,486 A | 4/1997 | Schmid et al. | ................ | 106/404 |
| 6,238,471 B1 | 5/2001 | Vogt et al. | ..................... | 106/417 |
| 6,569,529 B1 | 5/2003 | Phillips et al. | ................ | 428/403 |
| 6,586,098 B1 | 7/2003 | Coulter et al. | ................ | 428/403 |
| 6,689,205 B1 | 2/2004 | Brückner et al. | ............. | 106/415 |
| 7,256,425 B2 | 8/2007 | Weinert et al. | ................. | 257/77 |
| 7,273,522 B2 | 9/2007 | Bujard et al. | ................. | 106/481 |
| 7,374,609 B2 | 5/2008 | Bujard et al. | ............. | 106/31.65 |
| 7,452,597 B2 | 11/2008 | Bujard | .......................... | 428/402 |
| 7,510,765 B2 | 3/2009 | Bujard | .......................... | 428/403 |
| 2003/0047115 A1 | 3/2003 | Bauer et al. | .................... | 106/415 |
| 2003/0075079 A1 | 4/2003 | Sommer | ....................... | 106/442 |
| 2003/0147820 A1 | 8/2003 | Bertaux et al. | .................. | 424/63 |
| 2003/0207113 A1 | 11/2003 | Coulter et al. | ................ | 428/403 |
| 2004/0131776 A1 | 7/2004 | Weinert | ..................... | 427/255.7 |
| 2004/0144023 A1 | 7/2004 | Bruckner et al. | ............. | 47/29.4 |
| 2005/0252410 A1 | 11/2005 | Bujard et al. | ................. | 106/31.9 |
| 2006/0111466 A1 | 5/2006 | Bujard et al. | ................. | 523/160 |
| 2006/0165620 A1 | 7/2006 | Bujard et al. | ................... | 424/63 |

FOREIGN PATENT DOCUMENTS

| | | |
|---|---|---|
| DE | 19618569 | 11/1997 |
| EP | 0803549 | 10/1997 |
| JP | 09-071417 | 3/1997 |
| WO | 93/08237 | 4/1993 |
| WO | 00/69975 | 11/2000 |
| WO | 01/57287 | 8/2001 |
| WO | 02/10290 | 2/2002 |
| WO | 03/068868 | 8/2003 |
| WO | 03/106569 | 12/2003 |

OTHER PUBLICATIONS

G. Pfaff et al., Chem. Rev. vol. 99, (1999), pp. 1963-1981.
English language abstract for EP 0803549 (Oct. 1997).

*Primary Examiner* — Anthony J Green
*Assistant Examiner* — Pegah Parvini
(74) *Attorney, Agent, or Firm* — Qi Zhuo

(57) ABSTRACT

The present invention relates to pigments, the particles of which generally have a length of from 2 μm to 5 mm, a width of from 2 μm to 2 mm, and a thickness of from 20 nm to 2 μm, and a ratio of length to thickness of at least 2:1, wherein the particles contain a core of $SiO_2$ or a silicon/silicon oxide obtained by heating $SiO_y$ flakes with $1.1 \leq y \leq 1.8$ in an oxygen-free atmosphere at a temperature of at least 400° C., which core has a narrow distribution of particle sizes and two substantially parallel faces, the distance between which is the shortest axis of the core, and a material layer having a high index of refraction a metal oxide; a process for their production and their use in paints, ink-jet printing, for dyeing textiles, for pigmenting coatings (paints), printing inks, plastics, cosmetics, glazes for ceramics and glass.

12 Claims, No Drawings

INTERFERENCE PIGMENTS ON THE BASIS OF SILICON OXIDES

This is a continuation of U.S. application Ser. No. 10/530,099, now U.S. Pat. No. 7,517,404, which is a 371 of PCT/EP03/11077, filed Oct. 7, 2003, which disclosures are hereby incorporated by reference.

The present invention provides interference pigments having a core of $SiO_2$ or a silicon/silicon oxide and a material layer having a high index of refraction, for example a metal oxide layer having a high index of refraction, wherein the core has a narrow distribution of particle sizes and can be prepared by heating $SiO_y$ flakes with $1.1 \leq y \leq 1.8$ in an oxygen containing gas at a temperature of at least 200° C. or by heating $SiO_y$ flakes with $1.1 \leq y \leq 1.8$ in an oxygen-free atmosphere at a temperature of at least 400° C., wherein the $SiO_y$ flakes with $1.1 \leq y \leq 1.8$ have a thickness of from 20 to 200 nm and a defined thickness in the range of 30% of the average thickness, a method of producing the interference pigments and their use in paints, ink-jet printing, for dyeing textiles, for pigmenting coatings, printing inks, plastics, cosmetics, glazes for ceramics and glass.

Interference pigments having a core of $SiO_2$ are known (Gerhard Pfaff and Peter Reynders, Chem. Rev. 99 (1999) 1963-1981):

The $SiO_2$ flakes are produced, for example, by a process described in WO93/08237, wherein a sodium water glass solution is applied as a thin film on an endless band, solidified and dried. WO93/08237 also describes the coating of the $SiO_2$ flakes with a metal oxide having a high index of refraction or a thin semi-transparent metal layer.

WO98/53011 discloses multi-coated interference pigments consisting of a transparent carrier material which is coated with alternating metal oxide layers with a high and low refractive index, wherein the difference between the respective refractive indexes is 0.1. The metal oxide layers are obtained in a wet process by hydrolysis of the corresponding water-soluble metal compounds, by separating, drying and optionally calcinating the pigment thus obtained.

WO01/57287 describes a process comprising the production of a substrate material, for example, silicon oxide, by physical vapor deposition and the wet chemical coating of the obtained flakes with, for example, $TiO_2$. According to Example 4 of WO01/57287 silicon oxide flakes having a thickness of 200 nm and a particle size of 1 to 100 μm are obtained by PVD and then coated by a wet chemical process with $TiO_2$.

EP-A-803549 discloses coloured pigments containing (a) a core consisting of an essentially transparent or metallic reflecting material, and (b) at least a coating consisting essentially of one or more silicone oxides, the molar ratio of oxygen to a silicon being 0.25 to 0.95;

It is the object of the present invention to provide interference pigments, having higher color strength and color purity as compared with interference pigments known from the state of the art.

Said object has been solved by pigments, the particles of which generally have a length of from 2 μm to 5 mm, a width of from 2 μm to 2 mm, and a thickness of from 20 nm to 2 μm, and a ratio of length to thickness of at least 2:1, wherein the particles contain a core of $SiO_y$ with $0.70 \leq y \leq 1.95$, especially $1.1 \leq y \leq 1.8$, most preferred $1.4 \leq y \leq 1.8$, having two substantially parallel faces, the distance between which is the shortest axis of the core, comprising (a) a material, especially a metal oxide, having a high index of refraction, or pigments, the particles of which generally have a length of from 2 μm to 5 mm, a width of from 2 μm to 2 mm, and a thickness of from 20 nm to 2 μm, and a ratio of length to thickness of at least 2:1, wherein the particles contain a core of $SiO_y$ with $0.70 \leq y \leq 1.95$, especially $1.1 \leq y \leq 1.8$, most preferred $1.4 \leq y \leq 1.8$, having two substantially parallel faces, the distance between which is the shortest axis of the core, comprising
(a) a thin semi-transparent metal layer.

The term "$SiO_y$ with $0.70 \leq y \leq 1.95$" means that the molar ratio of oxygen to silicon at the average value of the silicon oxide layer is from 0.70 to 1.95. The composition of the silicon oxide layer can be determined by ESCA (electron spectroscopy for chemical analysis).

According to the present invention the term "aluminum" comprises aluminum and alloys of aluminum. Alloys of aluminum are, for example described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides of aluminum silicon, magnesium, manganese, copper, zinc, nickel, vanadium, lead, antimony, tin, cadmium, bismuth, titanium, Chromium and/or iron in amounts of less than 20% by weight, preferably less than 10% by weight.

Suitable metals for the semi-transparent metal layer are, for example, Cr, Ti, Mo, W, Al, Cu, Ag, Au, or Ni. The semi-transparent metal layer has typically a thickness of between 5 and 25 nm, especially between 5 and 15 nm. The $SiO_y$ substrates can have a metal layer only on one parallel surface, but preferably the metal layer is present on both parallel faces of the substrate.

The metal/$SiO_y$/metal flakes are prepared by a PVD process comprising the steps:
a) vapour-deposition of a separating agent onto a (movable) carrier to produce a separating agent layer,
b) vapour-deposition of a metal layer onto the separating agent layer,
c) vapour-deposition of an $SiO_y$ layer onto the metal layer, wherein $0.70 \leq y \leq 1.80$,
d) vapour-deposition of a metal layer onto the $SiO_y$ layer,
e) dissolution of the separating agent layer in a solvent, and
f) separation of the metal/$SiO_y$/metal flakes from the solvent.

Alternatively the metal layer can be obtained by wet chemical coating or by chemical vapor deposition, for example, gas phase deposition of metal carbonyls. The substrate is suspended in an aqueous and/or organic solvent containing medium in the presence of a metal compound and is deposited onto the substrate by addition of a reducing agent. The metal compound is, for example, silver nitrate or nickel acetyl acetonate (WO03/37993).

According to U.S. Pat. No. 3,536,520 nickel chloride can be used as metal compound and hypophosphite can be used as reducing agent. According to EP-A-353544 the following compounds can be used as reducing agents for the wet chemical coating: aldehydes (formaldehyde, acetaldehyde, benzaldehyde), ketones (acetone), carbonic acids and salts thereof (tartaric acid, ascorbinic acid), reductones (isoascorbinic acid, triosereductone, reductine acid), and reducing sugars (glucose).

If semi-transparent metal layers are desired, the thickness of the metal layer is generally between 5 and 25 nm, especially between 5 and 15 nm.

If pigments with metallic appearance are desired, the thickness of the metal layer is >25 nm to 100 nm, preferably 30 to 50 nm. If pigments with colored metal effects are desired, additional layers of colored or colorless metal oxides, metal nitrides, metal suldfides and/or metals can be deposited. These layers are transparent or semi-transparent. It is preferred that layers of high index of refraction and layers of low index of refraction alternate or that one layer is present, wherein within the layer the index of refraction is gradually changing. It is possible for the weathering resistance to be increased by means of an additional coating, which at the same time causes an optimal adaption to the binder system (EP-A-268918 and EP-A-632109).

In one preferred embodiment of the present invention, the interference pigments comprise materials having a "high" index of refraction, which is defined herein as an index of refraction of greater than about 1.65, and optionally materials having a "low" index of refraction, which is defined herein as an index of refraction of about 1.65 or less. Various (dielectric) materials that can be utilized including inorganic materials such as metal oxides, metal suboxides, metal fluorides, metal oxyhalides, metal sulfides, metal chalcogenides, metal nitrides, metal oxynitrides, metal carbides, combinations thereof, and the like, as well as organic dielectric materials. These materials are readily available and easily applied by physical, or chemical vapor deposition processes, or by wet chemical coating processes.

In an especially preferred embodiment, the interference pigments on the basis of the silicon oxide substrate comprises a further layer of a dielectric material having a "high" refractive index, that is to say a refractive index greater than about 1.65, preferably greater than about 2.0, most preferred greater than about 2.2, which is applied to the entire surface of the silicon/silicon oxide substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($Y_2O_3$), europium oxide ($Eu_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) or combinations thereof. The dielectric material is preferably a metal oxide. It being possible for the metal oxide to be a single oxide or a mixture of oxides, with or without absorbing properties, for example, $TiO_2$, $ZrO_2$, $Fe_2O_3$, $Fe_3O_4$, $Cr_2O_3$ or ZnO, with $TiO_2$ being especially preferred.

It is possible to obtain pigments that are more intense in colour and more transparent by applying, on top of the $TiO_2$ layer, a metal oxide of low refractive index, such as $SiO_2$, $Al_2O_3$, AlOOH, $B_2O_3$ or a mixture thereof, preferably $SiO_2$, and optionally applying a further $TiO_2$ layer on top of the latter layer (EP-A-892832, EP-A-753545, WO93/08237, WO98/53011, WO9812266, WO9838254, WO99/20695, WO0/42111, and EP-A-1213330). Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference.

Accordingly, preferred interference pigments comprise besides (a) a metal oxide of high refractive index in addition and (b) a metal oxide of low refractive index, wherein the difference of the refractive indices is at least 0.1.

Pigments on the basis of silicon oxide ($SiO_y$) substrates, which have been coated by a wet chemical method, in the indicated order are particularly preferred:

$TiO_2$ (substrate: silicon oxide; layer: $TiO_2$, preferably in the rutile modification), $(SnO_2)TiO_2$, $Fe_2O_3$, $Fe_3O_4$, $TiFe_2O_5$, $Cr_2O_3$, $ZrO_2$, $Sn(Sb)O_2$, BiOCl, $Al_2O_3$, $Ce_2S_3$, $MoS_2$, $Fe_2O_3.TiO_2$ (substrate: silicon oxide mixed layer of $Fe_2O_3$ and $TiO_2$), $TiO_2/Fe_2O_3$ (substrate: silicon oxide; first layer: $TiO_2$; second layer: $Fe_2O_3$), $TiO_2$/Berlin blau, $TiO_2/Cr_2O_3$, or $TiO_2/FeTiO_3$. In general the layer thickness ranges from 1 to 1000 nm, preferably from 1 to 300 nm.

In another particularly preferred embodiment the present invention relates to interference pigments containing at least three alternating layers of high and low refractive index, such as, for example, $TiO_2/SiO_2/TiO_2$, $(SnO_2)TiO_2/SiO_2/TiO_2$, $TiO_2/SiO_2/TiO_2/SiO_2/TiO_2$ or $TiO_2/SiO_2/Fe_2O_3$: Preferably the layer structure is as follows:

(A) a coating having a refractive index >1.65,
(B) a coating having a refractive index ≦1.65,
(C) a coating having a refractive index >1.65, and
(D) optionally an outer protective layer.

The thickness of the individual layers of high and low refractive index on the base substrate is essential for the optical properties of the pigment. The thickness of the individual layers, especially metal oxide layers, depends on the field of use and is generally 10 to 1000 nm, preferably 15 to 800 nm, in particular 20 to 600 nm.

The thickness of layer (A) is 10 to 550 nm, preferably 15 to 400 nm and, in particular, 20 to 350 nm. The thickness of layer (B) is 10 to 1000 nm, preferably 20 to 800 nm and, in particular, 30 to 600 nm. The thickness of layer (C) is 10 to 550 nm, preferably 15 to 400 nm and, in particular, 20 to 350 nm.

Particularly suitable materials for layer (A) are metal oxides, metal sulfides, or metal oxide mixtures, such as $TiO_2$, $Fe_2O_3$, $TiFe_2O_5$, $Fe_3O_4$, BiOCl, CoO, $CO_3O_4$, $Cr_2O_3$, $VO_2$, $V_2O_3$, $Sn(Sb)O_2$, $SnO_2$, $ZrO_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. Metal sulfide coatings are preferably selected from sulfides of tin, silver, lanthanum, rare earth metals, preferably cerium, chromium, molybdenum, tungsten, iron, cobalt and/or nickel.

Particularly suitable materials for layer (B) are metal oxides or the corresponding oxide hydrates, such as $SiO_2$, $MgF_2$, $Al_2O_3$, AlOOH, $B_2O_3$ or a mixture thereof, preferably $SiO_2$.

Particularly suitable materials for layer (C) are colorless or colored metal oxides, such as $TiO_2$, $Fe_2O_3$, $TiFe_2O_5$, $Fe_3O_4$, BiOCl, CoO, $CO_3O_4$, $Cr_2O_3$, $VO_2$, $V_2O_3$, $Sn(Sb)O_2$, $SnO_2$, $ZrO_2$, iron titanates, iron oxide hydrates, titanium suboxides (reduced titanium species having oxidation states from 2 to <4), bismuth vanadate, cobalt aluminate, and also mixtures or mixed phases of these compounds with one another or with other metal oxides. The $TiO_2$ layers can additionally contain an absorbing material, such as carbon, selectively absorbing colorants, selectively absorbing metal cations, can be coated with absorbing material, or can be partially reduced.

Interlayers of absorbing or nonabsorbing materials can be present between layers (A), (B), (C) and (D). The thickness of the interlayers is 1 to 50 nm, preferably 1 to 40 nm and, in particular, 1 to 30 nm.

In this embodiment preferred interference pigments have the following layer structure:

| | | | |
|---|---|---|---|
| $SiO_y$ | $TiO_2$ | $SiO_2$ | $TiO_2$ |
| $SiO_y$ | $TiO_2$ | $SiO_2$ | $Fe_2O_3$ |
| $SiO_y$ | $TiO_2$ | $SiO_2$ | $TiO_2/Fe_2O_3$ |
| $SiO_y$ | $TiO_2$ | $SiO_2$ | $(Sn,Sb)O_2$ |
| $SiO_y$ | $(Sn,Sb)O_2$ | $SiO_2$ | $TiO_2$ |
| $SiO_y$ | $Fe_2O_3$ | $SiO_2$ | $(Sn,Sb)O_2$ |
| $SiO_y$ | $TiO_2/Fe_2O_3$ | $SiO_2$ | $TiO_2/Fe_2O_3$ |
| $SiO_y$ | $TiO_2$ | $SiO_2$ | $MoS_2$ |
| $SiO_y$ | $TiO_2$ | $SiO_2$ | $Cr_2O_3$ |
| $SiO_y$ | $Cr_2O_3$ | $SiO_2$ | $TiO_2$ |
| $SiO_y$ | $Fe_2O_3$ | $SiO_2$ | $TiO_2$ |
| $SiO_y$ | $TiO_2$ | $Al_2O_3$ | $TiO_2$ |
| $SiO_y$ | $Fe_2TiO_5$ | $SiO_2$ | $TiO_2$ |
| $SiO_y$ | $TiO_2$ | $SiO_2$ | $Fe_2TiO_5/TiO_2$ |
| $SiO_y$ | TiO suboxides | $SiO_2$ | TiO suboxides |
| $SiO_y$ | $TiO_2$ | $SiO_2$ | $TiO_2 + SiO_2 + TiO_2 +$ Prussian Blue |
| $SiO_y$ | $TiO_2$ | $SiO_2$ | $TiO_2 + SiO_2 + TiO_2$ |
| $SiO_y$ | $TiO_2 + SiO_2 + TiO_2$ | $SiO_2$ | $TiO_2 + SiO_2 + TiO_2$ |

The pigments of the present invention are characterized by the precisely defined thickness and smooth surface of the thin $SiO_y$ flakes.

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A-45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235). $Al_2O_3$ layers (B) can advantageously be obtained by controlled oxidation during the cooling of aluminium-coated pigments, which is otherwise carried out under inert gas (DE-A-195 16 181).

Phosphate-, chromate- and/or vanadate-containing and also phosphate- and $SiO_2$-containing metal oxide layers can be applied in accordance with the passivation methods described in DE-A-42 36 332 and in EP-A-678 561 by means of hydrolytic or oxidative gaseous phase decomposition of oxide-halides of the metals (e.g. $CrO_2Cl_2$, $VOCl_3$), especially of phosphorus oxyhalides (e.g. $POCl_3$), phosphoric and phosphorous acid esters (e.g. di- and tri-methyl and di- and tri-ethyl phosphite) and of amino-group-containing organyl-silicon compounds (e.g. 3-aminopropyl-triethoxy- and -trimethoxy-silane).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-1467468, DE-A-1959988, DE-A-2009566, DE-A-22 14545, DE-A-22 15191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, WO 98/53001 and WO03/6558.

The metal oxide of high refractive index is preferably $TiO_2$ and/or iron oxide, and the metal oxide of low refractive index is preferably $SiO_2$. Layers of $TiO_2$ can be in the rutile or anastase modification, wherein the rutile modification is preferred. $TiO_2$ layers can also be reduced by known means, for example ammonia, hydrogen, hydrocarbon vapor or mixtures thereof, or metal powders, as described in EP-A-735,114, DE-A-3433657, DE-A4125134, EP-A-332071, EP-A-707, 050 or WO93/19131.

For the purpose of coating, the substrate particles are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, calcinated, it being possible to optimise the calcinating temperature with respect to the coating in question. If desired, after individual coatings have been applied, the pigments can be separated off, dried and, where appropriate, calcinated, and then again re-suspended for the purpose of precipitating further layers.

The metal oxide layers are also obtainable, for example, in analogy to a method described in DE-A-1 95 01 307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxy-propylamine. The organic solvent is a water-miscible organic solvent such as a $C_{1-4}$alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate is preferred. In addition, acetylacetonates and acetoacetylacetonates of the afore-mentioned metals may be used. Preferred examples of that type of metal acid ester are zirconium acetylacetonate, aluminium acetylacetonate, titanium acetylacetonate and diisobutyloleyl acetoacetylaluminate or diisopropyloleyl acetoacetylacetonate and mixtures of metal acid esters, for example Dynasil® (Hüls), a mixed aluminium/silicon metal acid ester.

As a metal oxide having a high refractive index, titanium dioxide is preferably used, the method described in U.S. Pat. No. 3 553 001 being used, in accordance with an embodiment of the present invention, for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as the "titration method", is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment. By adding small amounts of $SnO_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

The $TiO_2$ can optionally be reduced by usual procedures: U.S. Pat. No. 4,948,631 ($NH_3$, 750-850° C.), WO93/19131 ($H_2$, >900° C.) or DE-A-19843014 (solid reduction agent, such as, for example, silicon, >600° C.).

Where appropriate, an $SiO_2$ (protective) layer can be applied on top of the titanium dioxide layer, for which the following method may be used: A soda waterglass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

It is possible to obtain pigments that are more intense in colour and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof, preferably $SiO_2$, and applying a further $Fe_2O_3$ and/or $TiO_2$ layer on top of the latter layer. Such multi-coated interference pigments comprising a silicon oxide substrate and alternating metal oxide layers of with high and low refractive index can be prepared in analogy to the processes described in WO98/53011 and WO99/20695.

It is, in addition, possible to modify the powder colour of the pigment by applying further layers such as, for example, coloured metal oxides or Berlin Blue, compounds of transition metals, e.g. Fe, Cu, Ni, Co, Cr, or organic compounds such as dyes or colour lakes.

In addition, the pigment according to the invention can also be coated with poorly soluble, firmly adhering, inorganic or organic colourants. Preference is given to the use of colour lakes and, especially, aluminium colour lakes. For that purpose an aluminium hydroxide layer is precipitated, which is, in a second step, laked by using a colour lake (DE-A-24 29 762 and DE 29 28 287).

Furthermore, the pigment according to the invention may also have an additional coating with complex salt pigments, especially cyanoferrate complexes (EP-A-141 173 and DE-A-23 13 332).

To enhance the weather and light stability the multiplayer silicon oxide flakes can be, depending on the field of application, subjected to a surface treatment. Useful surface treatments are, for example, described in DE-A-2215191, DE-A-3151354, DE-A-3235017, DE-A-3334598, DE-A-4030727, EP-A-649886, WO97/29059, WO99/57204, and U.S. Pat. No. 5,759,255. Said surface treatment might also facilitate the handling of the pigment, especially its incorporation into various application media.

The $SiO_y$ flakes are prepared by a process comprising the steps (WO03/68868):
a) vapour-deposition of a separating agent onto a (movable) carrier to produce a separating agent layer,
b) vapour-deposition of an $SiO_y$ layer onto the separating agent layer, wherein $0.70 \leq y \leq 1.8$,
c) dissolution of the separating agent layer in a solvent, and
d) separation of the $SiO_y$ from the solvent.

$SiO_y$ with $y>1.0$ can be obtained by evaporation of SiO in the presence of oxygen. Layers, which are essentially free of absorption, can be obtained, if the growing $SiO_y$ layer is irradiated with UV light during evaporation (DE-A-1621214). It is possible to obtain $SiO_{1.5}$ layers, which do not absorb in the visible region and have a refractive index of 1.55 at 550 nm, by so-called "reactive evaporation" of SiO in a pure oxygen atmosphere (E. Ritter, J. Vac. Sci. Technol. 3 (1966) 225).

The $SiO_y$ layer in step b) being vapour-deposited from a vaporiser containing a charge comprising a mixture of Si and $SiO_2$, $SiO$, or a mixture thereof, the weight ratio of Si to $SiO_2$ being preferably in the range from 0.15:1 to 0.75:1, and especially containing a stoichiometric mixture of Si and $SiO_2$ or a vaporiser containing a charge comprising silicon monoxide containing silicon in an amount up to 20% by weight ($0.70 \leq y<1.0$). Step c) being advantageously carried out at a pressure that is higher than the pressure in steps a) and b) and lower than atmospheric pressure. The $SiO_y$ flakes obtainable by this method have a thickness in the range preferably from 20 to 2000 nm, especially from 20 to 500 nm, most preferred from 50 to 350 nm, the ratio of the thickness to the surface area of the plane-parallel structures being preferably less than 0.01 $\mu m^{-1}$. The plane-parallel structures thereby produced are distinguished by high uniformity of thickness, a superior planarity and smoothness (surface microstructure).

The silicon oxide layer in step b) is formed preferably from silicon monoxide vapour produced in the vaporiser by reaction of a mixture of Si and $SiO_2$ at temperatures of more than 1300° C.

The vapour-deposition in steps a) and b) is carried out preferably under a vacuum of <0.5 Pa. The dissolution of the separating agent layer in step c) is carried out at a pressure in the range preferably from 1 to $5 \times 10^4$ Pa, especially from 600 to $10^4$ Pa, and more especially from $10^3$ to $5 \times 10^3$ Pa.

The separating agent vapour-deposited onto the carrier in step a) may be a lacquer (coating), a polymer, such as, for example, the (thermoplastic) polymers, in particular acryl- or styrene polymers or mixtures thereof, as described in U.S. Pat. No. 6,398,999, an organic substance soluble in organic solvents or water and vaporisable in vacuo, such as anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxy-naphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol or a mixture of at least two of those substances. The separating agent is preferably an inorganic salt soluble in water and vaporisable in vacuo (see, for example, DE 19844 357), such as sodium chloride, potassium chloride, lithium chloride, sodium fluoride, potassium fluoride, lithium fluoride, calcium fluoride, sodium aluminium fluoride and disodium tetraborate.

The movable carrier may consist of one or more discs, cylinders or other rotationally symmetrical bodies, which rotate about an axis (cf. WO01/25500), and consists preferably of one or more continuous metal belts with or without a polymeric coating or of one or more polyimide or polyethylene terephthalate belts (U.S. Pat. No. 6,270,840).

Step d) may comprise washing-out and subsequent filtration, sedimentation, centrifugation, decanting and/or evaporation. The plane-parallel structures of $SiO_y$ may, however, also be frozen together with the solvent in step d) and subsequently subjected to a process of freeze-drying, whereupon the solvent is separated off as a result of sublimation below the triple point and the dry $SiO_y$ remains behind in the form of individual plane-parallel structures.

The invention relates also to plane-parallel structures of $SiO_y$ that are obtainable by this method and have a thickness preferably in the range from 20 to 2000 nm, especially 20 to 500 nm, most preferred 50 to 350 nm.

Except under an ultra-high vacuum, in technical vacuums of a few $10^{-2}$ Pa vaporised SiO always condenses as $SiO_y$, wherein $1 \leq y \leq 1.8$, especially wherein $1.1 \leq y \leq 1.8$, because high-vacuum apparatuses always contain, as a result of gas emission from surfaces, traces of water vapour which react with the readily reactive SiO at vaporisation temperature.

On its further course, the belt-form carrier, which is closed to form a loop, runs through dynamic vacuum lock chambers of known mode of construction (cf. U.S. Pat. No. 6,270,840) into a region of from 1 to $5 \times 10^4$ Pa pressure, preferably from 600 to $10^4$ Pa pressure, and especially from $10^3$ to $5 \times 10^3$ Pa pressure, where it is immersed in a dissolution bath. The temperature of the solvent should be so selected that its vapour pressure is in the indicated pressure range. With mechanical assistance, the separating agent layer rapidly dissolves and the product layer breaks up into flakes, which are then present in the solvent in the form of a suspension. On its further course, the belt is dried and freed from any contaminants still adhering to it. It runs through a second group of dynamic vacuum lock chambers back into the vaporisation chamber, where the process of coating with separating agent and product layer of SiO is repeated.

The suspension then present in both cases, comprising product structures and solvent, and the separating agent dissolved therein, is then separated in a further operation in accordance with a known technique. For that purpose, the product structures are first concentrated in the liquid and rinsed several times with fresh solvent in order to wash out the dissolved separating agent. The product, in the form of a solid that is still wet, is then separated off by filtration, sedimentation, centrifugation, decanting or evaporation.

The product can then be brought to the desired particle size by means of ultrasound or by mechanical means using high-speed stirrers in a liquid medium, or after drying the fragments in an air-jet mill having a rotary classifier, or means of grinding or air-sieving and delivered for further use.

In the production of the silicon/silicon oxide flakes, variants are possible:

It is possible to arrange several separating agent and product vaporisers one after the other in the running direction of the belt in the vaporisation zone. By that means there is obtained, with little additional outlay in terms of apparatus, a layer sequence of S+P+S+P, wherein S is the separating agent layer and P is the product layer. If the number of vaporisers is doubled and the belt speed is the same, twice the amount of product is obtained.

Separating off the plane-parallel structures after washing-out at atmospheric pressure can be carried out under gentle conditions by freezing the suspension, which has been concentrated to a solids content of about 50%, and subjecting it in known manner to freeze-drying at about $-10°$ C. and 50 Pa pressure. The dry substance remains behind as product, which can be subjected to the steps of further processing by means of coating or chemical conversion.

Instead of using a continuous belt, it is possible to produce the product by carrying out the steps of vapour-deposition of separating agent and SiO, of dissolution, and of drying the carrier, in an apparatus having a rotary body, in accordance with WO01/25500. The rotary body may be one or more discs, a cylinder or any other rotationally symmetrical body.

The $SiO_y$ flakes may be oxidised using an oxygen-containing gas such as, for example, air at a temperature of at least 200° C., especially at above 400° C., preferably in the form of loose material, in a fluidised bed or by introduction into an oxidising flame, preferably at a temperature in the range from 500 to 1000° C., to form plane-parallel structures of $SiO_y$ (WO03/068868).

At present, it can not be excluded, that by heating $TiO_2$/$SiO_y$ particles at a temperature above 400° C., especially 400 to 1100° C., reduction of $TiO_2$ by $SiO_y$

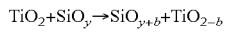

$$TiO_2 + SiO_y \rightarrow SiO_{y+b} + TiO_{2-b}$$

and/or disproportionation of $SiO_y$ in $SiO_2$ and Si occurs.

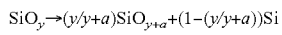

$$SiO_y \rightarrow (y/y+a)SiO_{y+a} + (1-(y/y+a))Si$$

In this disproportion $SiO_{y+a}$ flakes are formed, containing $(1-(y/y+a))Si$, wherein $0.03 \leq y \leq 1.95$, especially $0.70 \leq y \leq 0.99$ or $1 \leq y \leq 1.8$, $0.05 \leq a \leq 1.97$, especially $0.05 \leq a \leq 1.30$, and the sum y and a is equal or less than 2. $SiO_{y+a}$ is an oxygen enriched silicon suboxide.

The flakes of the present invention are not of a uniform shape. Nevertheless, for purposes of brevity, the flakes will be referred to as having a "diameter." The $SiO_y$ flakes have a high plane-parallelism and a defined thickness in the range of ±10%, especially ±5% of the average thickness. The $SiO_y$ flakes have a thickness of from 20 to 2000 nm, especially from 20 to 500 nm, most preferred 50 to 350 nm. It is presently preferred that the diameter of the flakes be in a preferred range of about 1-60 µm with a more preferred range of about 5-40 µm. Thus, the aspect ratio of the flakes of the present invention is in a preferred range of about 2 to 3000 with a more preferred range of about 14 to 800. If a $TiO_2$ layer is deposited as a material of high refractive index, the $TiO_2$ layer has a thickness of 20 to 200 nm, especially 20 to 100 nm, and more especially 20 to 50 nm. Due to the smaller thickness distribution of the $SiO_y$ flakes as compared to commercially available $SiO_2$ flakes effect pigments having a higher color purity result.

If the $SiO_y$ substrates of the present invention are used instead of mica flakes or $SiO_2$ substrates obtained according to the process described in WO93/08237, interference pigments having superior brilliance, clear and intense colors, intense color flop, improved color strength and color purity can be obtained.

In another preferred embodiment of the present invention the $SiO_y$ flakes have a thickness of from 20 to 200 nm, especially from 40 to 150 nm, most preferred 60 to 120 nm. The $SiO_y$ flakes have a high plane-parallelism and a defined thickness in the range of ±30%, especially ±10% of the average thickness. It is presently preferred that the diameter of the flakes be in a preferred range of about 1 to 60 µm, especially 2 to 50 µm, with a more preferred range of about 5-40 µm. Thus, the aspect ratio of the flakes of the present invention is in a preferred range of about 4 to 1250 with a more preferred range of about 42 to 670. If a $TiO_2$ layer is deposited as a material of high refractive index, the $TiO_2$ layer has a thickness of 20 to 200 nm, especially 50 to 200 nm. The total thickness of the TiO$_2$-coated SiO$_y$ flakes is especially 150 to 450 nm. Starting, for example, from SiO$_y$ flakes (y=1.4 to 1.8) having a thickness of 90 nm±30% it is possible to obtain red (ca. 73 nm), green (ca. 150 nm), or blue (ca. 130 nm) interference pigments by selecting the thickness of the TiO$_2$ layer. Due to the small thickness distribution of the SiO$_y$ flakes effect pigments result having a high color purity. The SiO$_y$ flakes may be oxidised using an oxygen-containing gas such as, for example, air at a temperature of at least 200° C., especially at above 400° C., preferably in the form of loose material, in a fluidised bed or by introduction into an oxidising flame, preferably at a temperature in the range from 500 to 1000° C., to form plane-parallel structures of SiO$_2$ (WO03/068868). Alternatively, the SiO$_y$ flakes can be heated in an oxygen-free atmosphere such as, for example, argon and/or helium or under a vacuum of less than 13 Pa ($10^{-1}$ Torr) at a temperature of at least 400° C., especially at above 400° C., preferably in the form of loose material, in a fluidised bed, preferably at a temperature in the range from 900 to 1100° C., to form the silicon/silicon oxide flakes. Both the SiO$_2$ flakes as well as the silicon/silicon oxide flakes can be used instead of the SiO$_y$ flakes as substrate for effect pigments.

Metallic or non-metallic, inorganic platelet-shaped particles or pigments are effect pigments, (especially metal effect pigments or interference pigments), that is to say, pigments that, besides imparting colour to an application medium, impart additional properties, for example angle dependency of the colour (flop), lustre (not surface gloss) or texture. On metal effect pigments, substantially oriented reflection occurs at directionally oriented pigment particles. In the case of interference pigments, the colour-imparting effect is due to the phenomenon of interference of light in thin, highly refractive layers.

The (effect) pigments according to the invention can be used for all customary purposes, for example for colouring polymers in the mass, coatings (including effect finishes, including those for the automotive sector) and printing inks (including offset printing, intaglio printing, bronzing and flexographic printing), and also, for example, for applications in cosmetics, in ink-jet printing, for dyeing textiles, glazes for ceramics and glass as well as laser marking of papers and plastics. Such applications are known from reference works, for example "Industrielle Organische Pigmente" (W. Herbst and K. Hunger, VCH Verlagsgesellschaft mbH, Weinheim/New York, 2nd, completely revised edition, 1995).

When the pigments according to the invention are interference pigments (effect pigments), they are goniochromatic and result in brilliant, highly saturated (lustrous) colours. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar colour to the effect pigment. Especially interesting combination effects are obtained, however, in analogy to, for example, EP-A-388 932 or EP-A-402 943, when the colour of the transparent pigment and that of the effect pigment are complementary. The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for coatings or printing inks, such as, for example, boiled linseed oil, nitrocellulose, alkyd resins, melamine resins and urea-formaldehyde resins or acrylic resins.

Depending on the intended purpose, it has proved advantageous to use the effect pigments or effect pigment compositions according to the invention as toners or in the form of preparations. Depending on the conditioning method or intended application, it may be advantageous to add certain amounts of texture-improving agents to the effect pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The (effect) pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the effect pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a coloured pigment of another colour, especially of a complementary colour, with colorations made using the effect pigment and colorations made using the coloured pigment having, at a measurement angle of 10°, a difference in hue ($\Delta H^*$) of from 20 to 340, especially from 150 to 210.

Preferably, the effect pigments according to the invention are combined with transparent coloured pigments, it being possible for the transparent coloured pigments to be present either in the same medium as the effect pigments according to the invention or in a neighbouring medium. An example of an arrangement in which the effect pigment and the coloured pigment are advantageously present in neighbouring media is a multi-layer effect coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting coatings and printing inks, the high molecular weight organic materials and the effect pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an effect pigment according to the invention in the high molecular weight organic material being pigmented, and processing a pigment composition according to the invention, are preferably carried out subject to conditions under which only relatively weak shear forces occur so that the effect pigment is not broken up into smaller portions.

Plastics comprising the pigment of the invention in amounts of 0.1 to 50% by weight, in particular 0.5 to 7% by weight. In the coating sector, the pigments of the invention are employed in amounts of 0.1 to 10% by weight. In the pigmentation of binder systems, for example for paints and printing inks for intaglio, offset or screen printing, the pigment is incorporated into the printing ink in amounts of 0.1 to 50% by weight, preferably 5 to 30% by weight and in particular 8 to 15% by weight.

The colorations obtained, for example in plastics, coatings or printing inks, especially in coatings or printing inks, more especially in coatings, are distinguished by excellent properties, especially by extremely high saturation, outstanding fastness properties, high color purity and high goniochromicity.

When the high molecular weight material being pigmented is a coating, it is especially a speciality coating, very especially an automotive finish.

The effect pigments according to the invention are also suitable for making-up the lips or the skin and for colouring the hair or the nails.

The invention accordingly relates also to a cosmetic preparation or formulation comprising from 0.0001 to 90% by weight of a pigment, especially an effect pigment, according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations. The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eye-liners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecaneoxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl paimitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingre-dients that is approved for dermal or topical application. The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example Grillocin® (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers.

If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

The Examples that follow illustrate the invention without limiting the scope thereof. Unless otherwise indicated, percentages and parts are percentages and parts by weight, respectively.

EXAMPLES

Example 1

In a vacuum system which in its fundamental points is constructed analogously to the system described in U.S. Pat. No. 6,270,840, the following are vaporised, from vaporisers, in succession: sodium chloride (NaCl) as separating agent at about 900° C., and silicon monoxide (SiO) as reaction product of Si and $SiO_2$ at from 1350 to 1550° C. The layer thickness of NaCl is typically 30-50 nm, that of $SiO_y$ being, depending on the intended purpose of the end product, from 100 to 2000 nm, in the present case 200 nm. Vaporisation is carried out at about 0.02 Pa, amounting to about 11 g of NaCl and 72 g of SiO per minute. For subsequently detaching the layers by dissolution of the separating agent, the carrier on which vapour-deposition has taken place is sprayed at about 3000 Pa with deionised water and treated with mechanical assistance using scrapers and with ultrasound. The NaCl dissolves and the $SiO_y$ layer, which is insoluble, breaks up into flakes. The suspension is continuously removed from the dissolution chamber and, at atmospheric pressure, is concentrated by filtration and rinsed several times with deionised water in order to remove $Na^+$ and $Cl^-$ ions that are present. That is followed by the steps of drying and heating the plane-parallel $SiO_y$ structures in the form of loose material at 500 to 600° C. for two hours in an oven through which air heated to 500 to 600° C. is passed. After cooling, comminution and grading by air-sieving are carried out.

Example 2

Two Layer System

1) $TiO_2$ Layer:

100 g of the $SiO_y$ flakes obtained in example 1 are suspended in 1.5 l fully deionized water and heated to 75° C. To this suspension 160 ml of an aqueous solution of $TiCl_4$ (400 g $TiCl_4$/l) is metered within 90 minutes. The pH is kept constant at pH=2.2 by means of 32% sodium hydroxide solution. After this solution has been added, the mixture is stirred for a further approximately 30 minutes at 75° C.

2) $SiO_2$ Layer:

The pH of the suspension is increased by means of sodium hydroxide solution to 7.5 and within 3.5 hours 720 ml a sodium water glass solution is metered (125 g $SiO_2$/l) at 75° C. During the addition the pH is kept constant by means of 10% hydrochloric acid. After this solution has been added, the mixture is stirred for a further 30 minutes at 75° C. The thus obtained pigment is characterized intense blue interference color.

Example 3

3 Layer System comprising a $Fe_2O_3$ Layer

1) $TiO_2$ Layer:

The $TiO_2$ layer is obtained as described in Example 1.

2) $SiO_2$ Layer:

The $SiO_2$ layer is obtained as described in Example 1.

3) $Fe_2O_3$ Layer:

The pH of the suspension of the silicon oxide flakes coated succesively with $TiO_2$ and $SiO_2$ is controlled by means of 10% hydrochloric acid to 3.0. Then 1750 ml of an aqueous $FeCl_3$-Lösung (35 g Fe/l) are added at 75° C. within 5 h. The pH is kept constant by simultaneously adding 32% NaOH. After this solution has been added, the mixture is stirred for a further approximately 45 minutes at 75° C. After the suspension has cooled to room temperature, the product is filtered, washed saltfree with water and dried at 110° C. Then the pigment is calcinated 30 minutes at 850° C.

Example 4

250 mg of 295 nm thick $SiO_y$ (y ~1.7-1.8) flakes (average diameter ~50 microns), which have a green color on a black background, are mixed in 35 ml deionized water and then heated to 60° C. The pH is adjusted to 1.4 with 1N hydrochloric acid. 10 ml of $TiOCl_2$ (diluted with 1N HCl, such that the solution comprises 1.5% of titanium) are added to the solution during 5 hours, while maintaining the pH at 1.4 by continuous addition of sodium hydroxide.

The liquid is cooled to room temperature and filtered with a 20 micron sieve. The obtained powder is dried for 1 hour at 60° C. in air. White looking flakes are obtained which have a bright blue color when viewed on a black background. The color depends on the observation angle and turns violet and then yellow when increasing the viewing angle.

The invention claimed is:

1. A pigment, the particles of which have a length of from 2 μm to 5 mm, a width of from 2 μm to 2 mm, and a ratio of length to thickness of at least 2:1, wherein the particles consist of a core of $SiO_2$ or a silicon/silicon oxide obtained by heating $SiO_y$ flakes with $1.1 \leq y \leq 1.8$ in an oxygen-free atmosphere at a temperature of at least 400° C., which core has a thickness of from 20 to 200 nm, a defined thickness in the range of 30% of the average thickness, high plane-parallelism and two substantially parallel faces, the distance between which is the shortest axis of the core;

and a material layer having a high index of refraction; and optionally an additional layer or layers, which layer or layers consist of a material selected from a dielectric material having a high index of refraction, a dielectric material having a low index of refraction, one or more inorganic colorant, one or more organic colorant and mixtures thereof, which pigment particle may also have a surface treatment.

2. A pigment according to claim 1, wherein the thickness of the particle core is from 50 to 150.

3. A pigment according to claim 1, wherein the dielectric material having a high index of refraction is one or more compounds selected from the group consisting of ZnS, ZnO, $ZrO_2$, $TiO_2$, carbon, $In_2O_3$, indium tin oxide, $Ta_2O_5$, $Cr_2O_3$, $CeO_2$, $Y_2O_3$, $Eu_2O_3$, $Fe_3O_4$, $Fe_2O_3$, HfN, HfC, $HfO_2$, $La_2O_3$, MgO, $Nd_2O_3$, $Pr_6O_{11}$, $Sm_2O_3$, $Sb_2O_3$, SiO, $Se_2O_3$, $SnO_2$ and $WO_3$.

4. A pigment according to claim 1, wherein the material having a high index of refraction is a metal oxide.

5. A pigment according to claim 1, wherein the dielectric material having a high refractive index is one or more compounds selected from the group consisting of $TiO_2$, $ZrO_2$, $Fe_2O_3$, $Fe_3O_4$, $Cr_2O_3$, ZnO, an iron titanate, an iron oxide hydrate and a titanium suboxide, or a mixed phase of these compounds.

6. Paints, printing inks, textiles, coatings, plastics, cosmetics, glazes for ceramics and glass, which are comprising a pigment according to claim 1.

7. A pigment, the particles of which have a length of from 2 μm to 5 mm, a width of from 2 μm to 2 mm, and a ratio of length to thickness of at least 2:1, wherein the particles consist of a core of $SiO_2$ obtained by heating $SiO_y$ flakes with $1.1 \leq y \leq 1.8$ in an oxygen containing gas at a temperature of at least 200° C. or a silicon/silicon oxide obtained by heating $SiO_y$ flakes with $1.1 \leq y \leq 1.8$ in an oxygen-free atmosphere at a temperature of at least 400° C., wherein the $SiO_y$ flakes with $1.1 \leq y \leq 1.8$ have a thickness of from 20 to 200 nm and a defined thickness in the range of 30% of the average thickness, which core has a thickness of from 20 to 200 nm, high plane-parallelism and two substantially parallel faces, the distance between which is the shortest axis of the core;

and a material layer having a high index of refraction; and optionally an additional layer or layers, which layer or layers consist of a material selected from a dielectric material having a high index of refraction, a dielectric material having a low index of refraction, one or more inorganic colorant, one or more organic colorant and mixtures thereof, which pigment particle may also have a surface treatment.

8. A pigment according to claim 7, wherein the thickness of the particle core is from 50 to 150.

9. A pigment according to claim 7, wherein the dielectric material having a high index of refraction is one or more compounds selected from the group consisting of ZnS, ZnO, $ZrO_2$, $TiO_2$, carbon, $In_2O_3$, indium tin oxide, $Ta_2O_5$, $Cr_2O_3$, $CeO_2$, $Y_2O_3$, $Eu_2O_3$, $Fe_3O_4$, $Fe_2O_3$, HfN, HfC, $HfO_2$, $La_2O_3$, MgO, $Nd_2O_3$, $Pr_6O_{11}$, $Sm_2O_3$, $Sb_2O_3$, SiO, $Se_2O_3$, $SnO_2$ and $WO_3$.

10. A pigment according to claim 7, wherein the material having a high index of refraction is a metal oxide.

11. A pigment according to claim 7, wherein the dielectric material having a high refractive index is one or more compounds selected from the group consisting of $TiO_2$, $ZrO_2$, $Fe_2O_3$, $Fe_3O_4$, $Cr_2O_3$, ZnO, an iron titanate, an iron oxide hydrate and a titanium suboxide, or a mixed phase of these compounds.

12. Paints, printing inks, textiles, coatings, plastics, cosmetics, glazes for ceramics and glass, which are comprising a pigment according to claim 7.

* * * * *